United States Patent
Thorpe

(10) Patent No.: US 8,540,322 B2
(45) Date of Patent: Sep. 24, 2013

(54) REAR WHEEL ASSEMBLY FOR A BICYCLE

(75) Inventor: Richard Thorpe, London (GB)

(73) Assignee: Karbon Kinetics Limited, London (GB)

( * ) Notice: Subject to any disclaimer, the term of this patent is extended or adjusted under 35 U.S.C. 154(b) by 560 days.

(21) Appl. No.: 12/727,126

(22) Filed: Mar. 18, 2010

(65) Prior Publication Data

US 2011/0084544 A1    Apr. 14, 2011

Related U.S. Application Data

(62) Division of application No. 10/551,505, filed on Oct. 18, 2006, now Pat. No. 7,708,297.

(30) Foreign Application Priority Data

Mar. 31, 2003    (GB) .................................. 0307429.1

(51) Int. Cl.
*B60B 27/00* (2006.01)

(52) U.S. Cl.
USPC ..................................................... 301/110.5

(58) Field of Classification Search
USPC .............. 301/110.5, 105.1, 111.03, 119, 121; 280/284
See application file for complete search history.

(56) References Cited

U.S. PATENT DOCUMENTS

| | | | |
|---|---|---|---|
| 4,170,369 A | 10/1979 | Strutmann | |
| 4,659,097 A | 4/1987 | Kuepper et al. | |
| 5,390,947 A | 2/1995 | Pong et al. | |
| 5,413,368 A | 5/1995 | Pong et al. | |
| 5,549,315 A * | 8/1996 | Ashman | 301/110.5 |
| 5,823,555 A * | 10/1998 | Ashman | 301/110.5 |
| 6,355,996 B1 | 3/2002 | Birkestrand | |
| 6,623,023 B2 | 9/2003 | Niitsu et al. | |
| 6,688,625 B1 | 2/2004 | Schreuder et al. | |
| 6,910,702 B1 | 6/2005 | Hals | |
| 7,104,562 B2 | 9/2006 | Schmider et al. | |
| 7,264,257 B2 | 9/2007 | Sanders | |
| 7,708,297 B2 * | 5/2010 | Thorpe | 280/281.1 |

FOREIGN PATENT DOCUMENTS

| | | |
|---|---|---|
| DE | 880712 | 6/1953 |
| DE | 3804342 | 8/1989 |
| DE | 3941221 | 6/1991 |
| DE | 19702764 | 8/1997 |
| DE | 19840576 | 3/2000 |
| EP | 1142780 | 10/2001 |
| EP | 1270395 | 1/2003 |
| FR | 2618402 | 1/1989 |
| GB | 2171656 | 9/1986 |
| JP | 2000142539 | 5/2000 |

* cited by examiner

*Primary Examiner* — Jason Bellinger
(74) *Attorney, Agent, or Firm* — Baker Botts L.L.P.

(57) ABSTRACT

A wheel and rear hub gearbox assembly for single-sided mounting to a bicycle frame, with the gearbox mounted to the frame by a bearing situated intermediate the axial extent of the gearbox casing. The wheel is detachably mounted to the gearbox casing by cooperating mounting formations on the wheel and at one end of the casing. The wheel is positioned relative to the gearbox such that when the wheel is mounted to the gearbox casing, the bearing is central, in the axial direction, relative to the wheel.

7 Claims, 13 Drawing Sheets

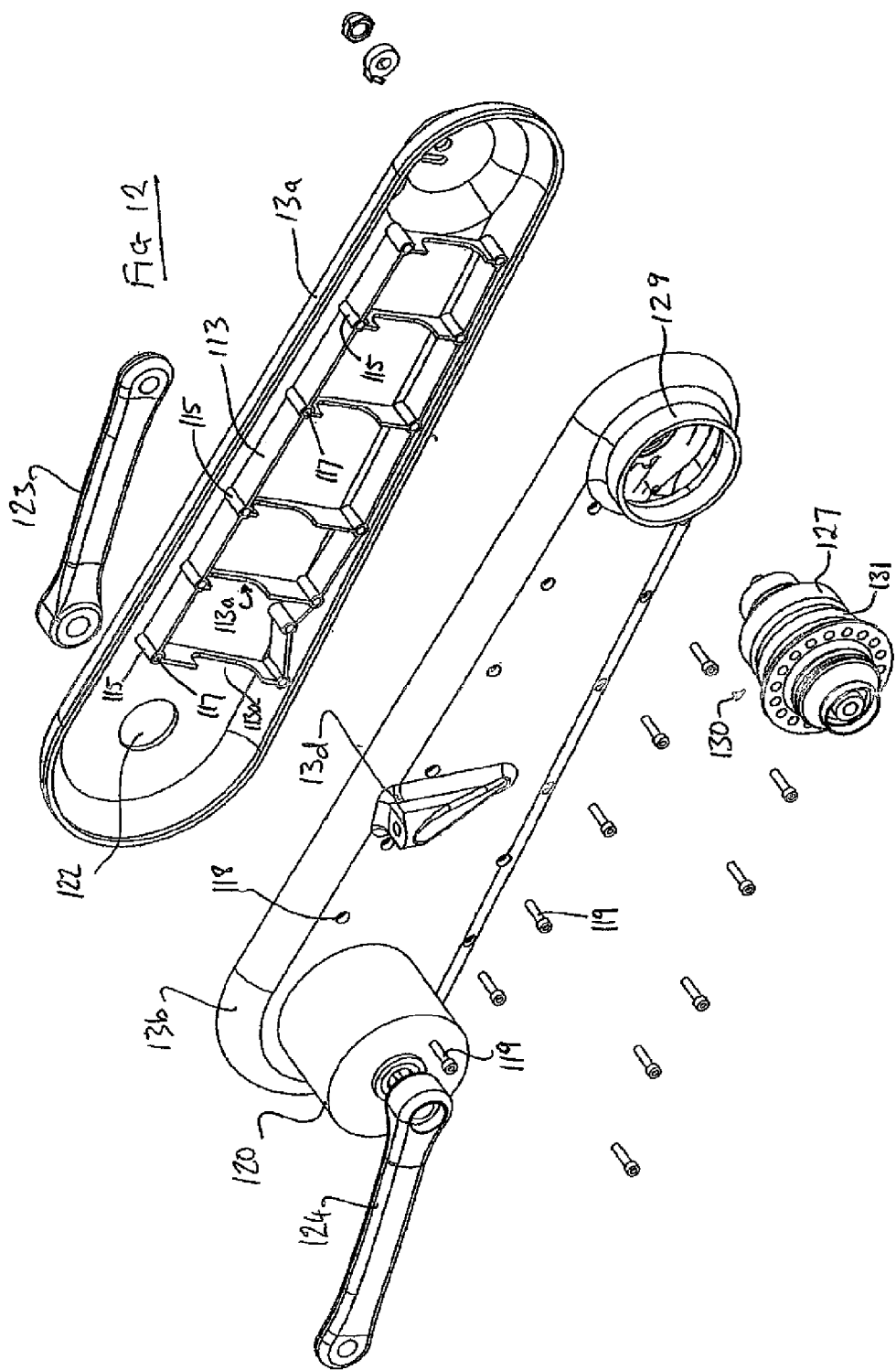

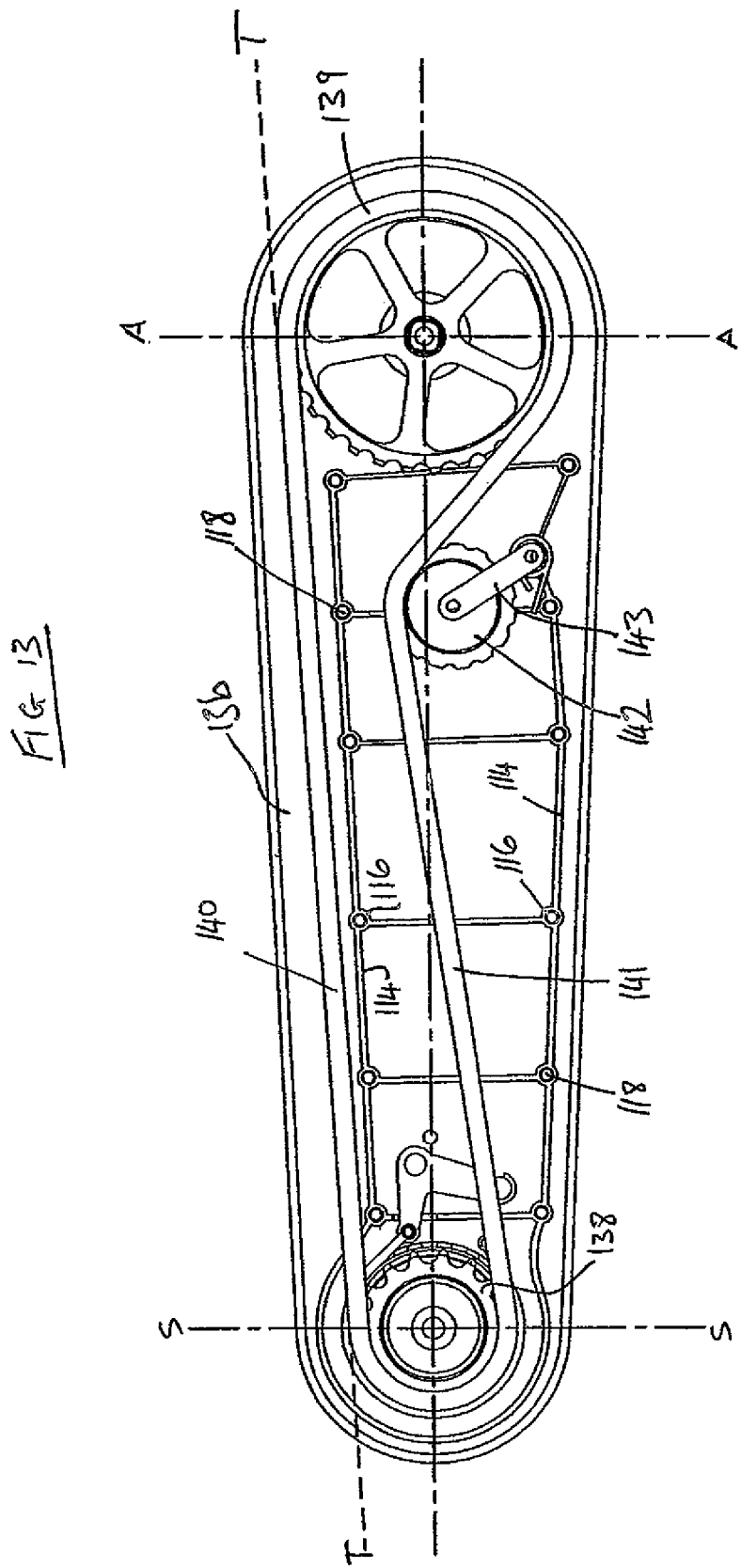

REAR WHEEL ASSEMBLY FOR A BICYCLE

CROSS REFERENCE TO RELATED APPLICATIONS

This application is a divisional of U.S. patent application Ser. No. 10/551,505, filed Oct. 18, 2006, which issued as U.S. Pat. No. 7,708,297 on May 4, 2010, and is based on and claims priority to International Application No. PCT/GB04/000941, filed Mar. 5, 2004 and Great Britain Application No. 0307429.1, filed Mar. 31, 2003. Each of these documents is incorporated by reference herein in their entireties for all purposes.

BACKGROUND OF THE INVENTION

The present invention relates to bicycles, and is particularly concerned with bicycles having a planetary gear-change mechanism contained in the hub of the driven wheel.

Hub mounted gearboxes are well known in the bicycle art, and are conventionally based on the widely understood, planetary gearbox principle. Planetary-geared hubs for bicycles having two, three, four, five, seven, eight, and even fourteen speed ratios are currently available commercially.

In a conventional three-speed hub-mounted gearbox, a central spindle is provided which is rigidly attachable at both its ends to the bicycle frame. A sun gear is non-rotatably mounted to the spindle, and engages planet gears mounted in a planet carrier rotatably carried by the spindle. A drive sprocket, to engage the bicycle chain, rotates coaxially with the spindle.

An annulus gear is engaged with the planet gears, and is movable to engage and rotate with either the drive sprocket or with the outer casing of the hub, to which the spokes of the wheel are attached. The planet carrier is likewise movable to engage and rotate with either the drive sprocket or the hub.

In the "low" gear position, the drive sprocket and annulus rotate together, and the planet carrier rotates with the hub, so that the wheel rotates more slowly than the drive sprocket.

In the "middle" gear position, the drive sprocket engages the annulus and the hub likewise engages the annulus, so that the wheel rotates at the same speed as the drive sprocket.

In the "high" gear position, the drive sprocket engages the planet carrier and the annulus engages the hub, so that the wheel rotates faster than the drive sprocket.

The present invention does not concern the inner workings of the hub gearbox, beyond the considerations that the bicycle wheel is mounted to the outer casing of the gearbox, and the central spindle must be held against rotation relative to the bicycle frame in order to transmit torque from the drive sprocket to the outer casing of the gearbox and thence to the wheel.

The main advantage of a planetary-geared hub is that the gears are compactly sealed within the hub outer casing. Because the gears are protected from water and debris, planetary-geared hubs require low maintenance.

Another advantage is that there is no requirement for a rear derailleur mechanism to shift gears. This simplifies the bicycle chain drive because the chain path does not move relative to the bicycle frame as the rider changes gear, as is the case with conventional multi-sprocket derailleur arrangements. Since there is a fixed chain path, a chain cover can be fitted to the bicycle to further protect the bicycle chain drive from dirt. This chain cover also protects the rider's leg or clothing from soiling by chain lubricants.

There are, however, drawbacks to the current state of the art in planetary-geared hubs. Because planetary-geared hubs are usually designed with a long central spindle whose ends are adapted to be mounted to the bicycle frame on either side of the rear bicycle wheel, then in order to remove the tyre from the wheel, for example if the tyre is punctured, the entire rear wheel—including the planetary-geared hub—must be removed from the bicycle frame in order to repair the flat tyre. This can be extremely time consuming.

If the bicycle has been fitted with a rear chain drive cover, even more time is required to remove the rear wheel. First the cover must be removed, and then the planetary-geared hub axle nuts must be loosened. The bicycle drive chain can then be removed and consequently, the planetary-geared hub, including the rear bicycle wheel, can be removed and the tyre can then be repaired.

Another drawback to current planetary-geared hubs is that if the rear wheel needs to be removed for transporting the bicycle in a car or for storing the bicycle in a compact space, the same time-consuming procedure must be followed.

It has been proposed, in a bicycle referred to as an "Entertainment Vehicle" and exhibited by Sony Corporation in Japan in 2000, to mount a planetary-geared hub to a bicycle frame having a single rear arm extending on only one side of the rear bicycle wheel. Such a mounting allows the tyre to be removed without the need to remove either the planetary geared hub or the wheel from the bicycle frame. The Entertainment Vehicle has a solid rear arm, in order to achieve the required rigidity and strength, and an entirely exposed rear chain drive comprising a drive sprocket attached to pedals mounted to the bicycle frame, a driven sprocket at the rear hub, and a drive chain linking the sprockets.

SUMMARY OF THE INVENTION

An objective of the present invention is to provide a compact bicycle in which the rear wheel is provided with a planetary transmission in the hub, the rear wheel is mounted from one side only, and wherein the drive train from the pedals to the rear wheel is enclosed.

A further objective is to provide a bicycle having a rear wheel mounted to the bicycle frame on one side only and provided with a hub gearbox, wherein the rear wheel is removably mounted to the hub gearbox, so that the rear wheel may be removed without removing the gearbox from the bicycle.

One aspect of the present invention provides a bicycle having front and rear wheels mounted to a frame, wherein the rear wheel comprises a hub-mounted planetary gearbox having an outer casing, a spindle and a driven wheel, and wherein the rear wheel is mounted to the frame at one side of the wheel only by means of a rear arm having a transversely-extending mounting portion at its rear end adapted to engage a bearing mounted to the casing of the gearbox, and the rear arm being substantially tubular in form with a central cavity adapted to receive a driving wheel, the driven wheel, and an endless tension element for transmitting driving force from the driving wheel to the driven wheel.

The endless tension element is advantageously a chain, and the driving and driven wheels are sprockets. Alternatively the endless tension element may be a toothed or plain belt, and the driving and driven wheels may be corresponding pulleys.

The rear arm may be a cantilever arm fixedly mounted at its forward end to the bicycle frame, or the rear arm may be braced by a strut extending from a point at or near its rear end to the frame.

The bicycle frame may incorporate rear suspension by pivotally mounting the front end of the rear arm to the bicycle frame to form a swinging arm, and mounting the wheel to the rear end of the swinging arm. In this case a spring and damper assembly will be provided, acting between the swinging arm and the frame.

A second aspect of the invention provides a frame for a bicycle, to which a rear wheel having a hub gearbox having an outer casing, a spindle and a driven wheel may be mounted with one side of the wheel unobstructed by frame elements, the frame comprising a rear arm having a transversely-extending mounting portion at its rear end adapted to engage a bearing mounted to the casing of the gearbox, and the rear arm being substantially tubular in form with a central cavity adapted to receive a driving wheel, the driven wheel, and an endless tension element for transmitting driving force from the driving wheel to the driven wheel.

In one embodiment the frame comprises a single rear arm, to the rear end of which the rear wheel is mountable, with the wheel positioned to one side of the rear arm. Alternatively, the rear arm may be braced by a strut extending from a point at or near its rear end to the frame.

A third aspect of the invention provides a rear arm for a bicycle frame, to which a rear wheel having a hub gearbox having an outer casing, a spindle and a driven wheel may be mounted with one side of the wheel unobstructed, the rear arm having a transversely-extending mounting portion at its rear end adapted to engage a bearing mounted to the casing of the gearbox, and the rear arm being substantially tubular in form with a central cavity adapted to receive a driving wheel, the driven wheel, and an endless tension element for transmitting driving force from the driving wheel to the driven wheel.

The driving wheel may be mounted to a pedal axle supported in bearings mounted in the rear arm.

In one embodiment, the rear arm comprises a pair of concave half-shells having internal ribs extending between internal studs integrally formed with the ribs and the half-shells respectively. Preferably the studs 115 of one half-shell are formed with blind threaded holes, while the studs of the other half-shell are formed with through holes to accept threaded fasteners for securing the half-shells together. The ribs and studs may be positioned, in relation to a chain loop running within the rear arm, so as to minimise the overall size of the rear arm. All or some of the studs may be positioned within an area bounded by the chain loop.

A further aspect of the invention provides a hub for a bicycle wheel comprising a generally cylindrical casing for a planetary gearbox, the casing being adapted to receive an external bearing intermediate the axial extent of the casing for mounting the hub to a bicycle frame, and the hub further comprising releasable mounting elements cooperable with mounting formations formed on a bicycle wheel. The wheel may be a conventional spoked wheel, or a moulded wheel.

A yet further aspect of the invention provides a hub-mountable planetary gearbox for a bicycle, comprising a central spindle attachable at one end to a bicycle frame, and an axisymmetric outer casing having a circumferential bearing surface intermediate its axial extent, the bearing surface being engageable with a supporting bearing for mounting the gearbox to a bicycle frame, and means for releasably attaching a bicycle wheel to the gearbox casing. A pair of spaced bearing surfaces may be provided instead of a single bearing surface.

The gearbox is preferably provided with the means for attaching the bicycle wheel to the gearbox casing at its axial end remote from said one end. Most preferably the bearing surface is positioned to be substantially central, in the axial direction, relative to the wheel in its mounted position.

Preferably the outer hub casing is made of steel or aluminium similar to current planetary-geared hub outer casings. The rotatable bearing may be of the ball, roller, or tapered roller type. The means for attaching the bicycle wheel may comprise a screw thread, or fixing elements cooperable with mounting elements of a mating hub of a bicycle wheel.

BRIEF DESCRIPTION OF THE DRAWINGS

Exemplary embodiments of the invention will now be described with reference to the accompanying drawings in which:

FIG. 12 is an exploded perspective view from the near side of the rear arm of FIG. 11; and FIG. 13 is a schematic cutaway side view from the off side of a rear arm of the rear arm of FIGS. 11 and 12.

DETAILED DESCRIPTION OF THE DRAWINGS

Figure 1:
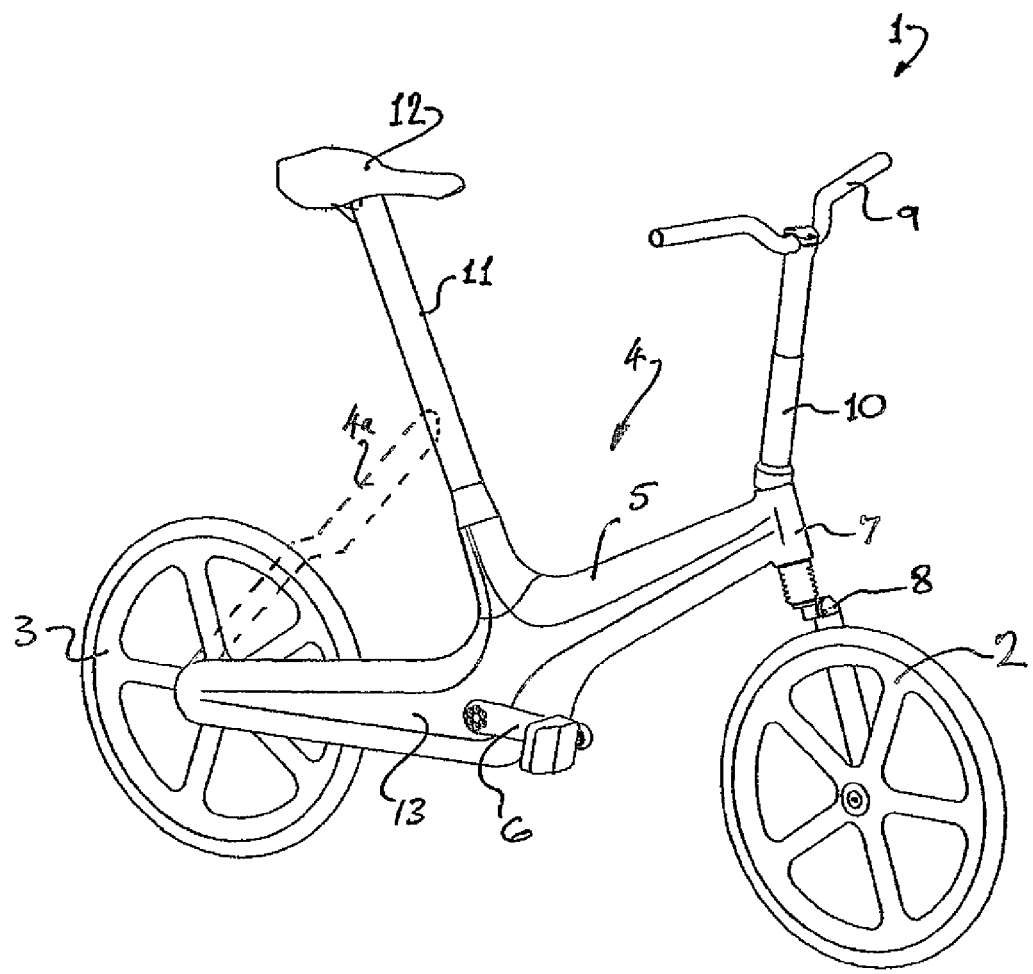
FIG. 1 is a perspective view of a rigid-frame bicycle incorporating the hub gear.

Referring now to the drawings, FIG. 1 shows a rigid-frame bicycle 1, having both its front 2 and rear 3 wheels mounted to the frame 4 at only one end of their respective axles.

The bicycle frame 4 comprises a rigid lower tube 5, to the approximate centre of which the pedals 6 are mounted. The forward end of the lower tube 5 incorporates a steering tube 7, to which the front fork assembly 8 and the handlebars 9 and handlebar stem 10 are mounted for rotation as a single unit.

Extending upwardly from the approximate centre of the lower tube 5 is the saddle stem 11, to the top of which the saddle 12 is mounted.

The part of the lower tube 5 extending rearwardly from the pedals 6 constitutes a rear arm 13, to one side of which the rear wheel 3 is mounted. The frame 4 is so arranged that the mid-plane of the rear wheel 3 passes through the steering tube 7 and through the centre of the saddle 12. The rear arm 13 may be laterally offset from the forward part of the lower tube 5 to achieve this geometrical arrangement.

An optional reinforcing strut 4a may extend from the rear arm 13 to the saddle stem 11, to reduce stresses at the forward end of the rear arm 13.

Figure 2:
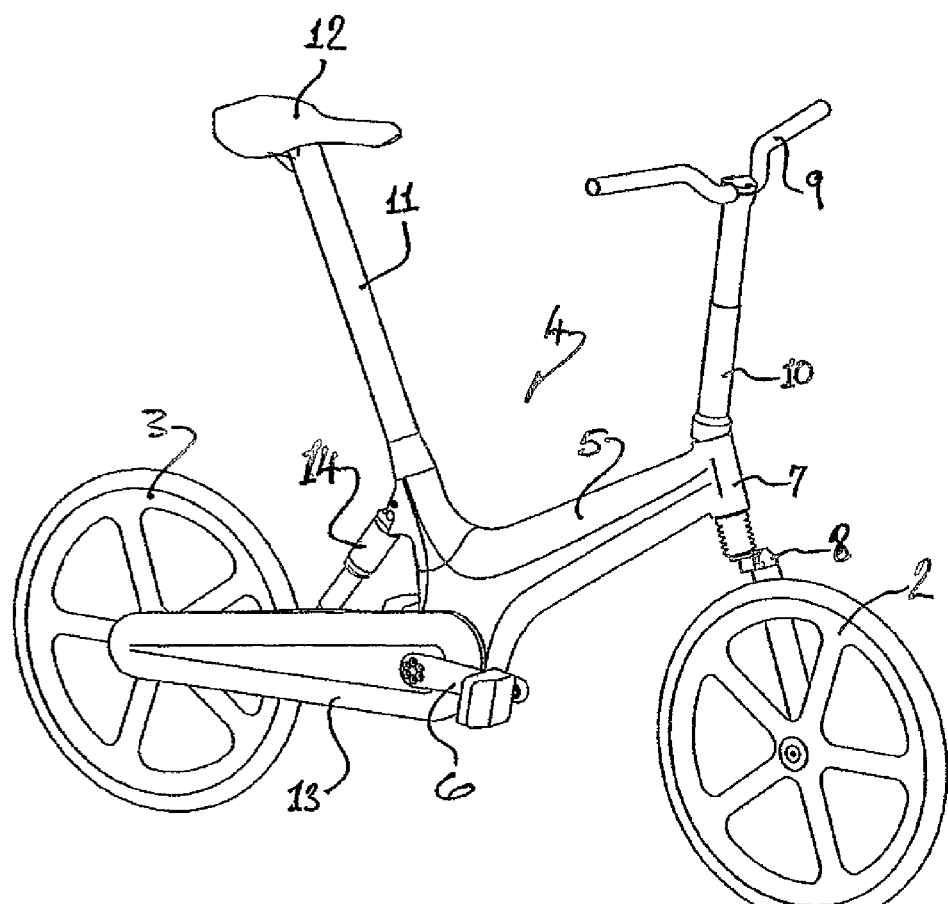
FIG. 2 is a perspective view of a full-suspension bicycle incorporating the hub gear.

FIG. 2 is a view similar to FIG. 1, showing a bicycle having rear suspension. In this embodiment, the rear arm 13 is pivotally mounted at its forward end to the lower tube 5 of the frame 4. A spring and damper assembly 14 extends between the rear arm 13 and the lower part of the saddle stem 11. In other respects, the frame 4 is similar to that described in relation to FIG. 1.

Figure 3:
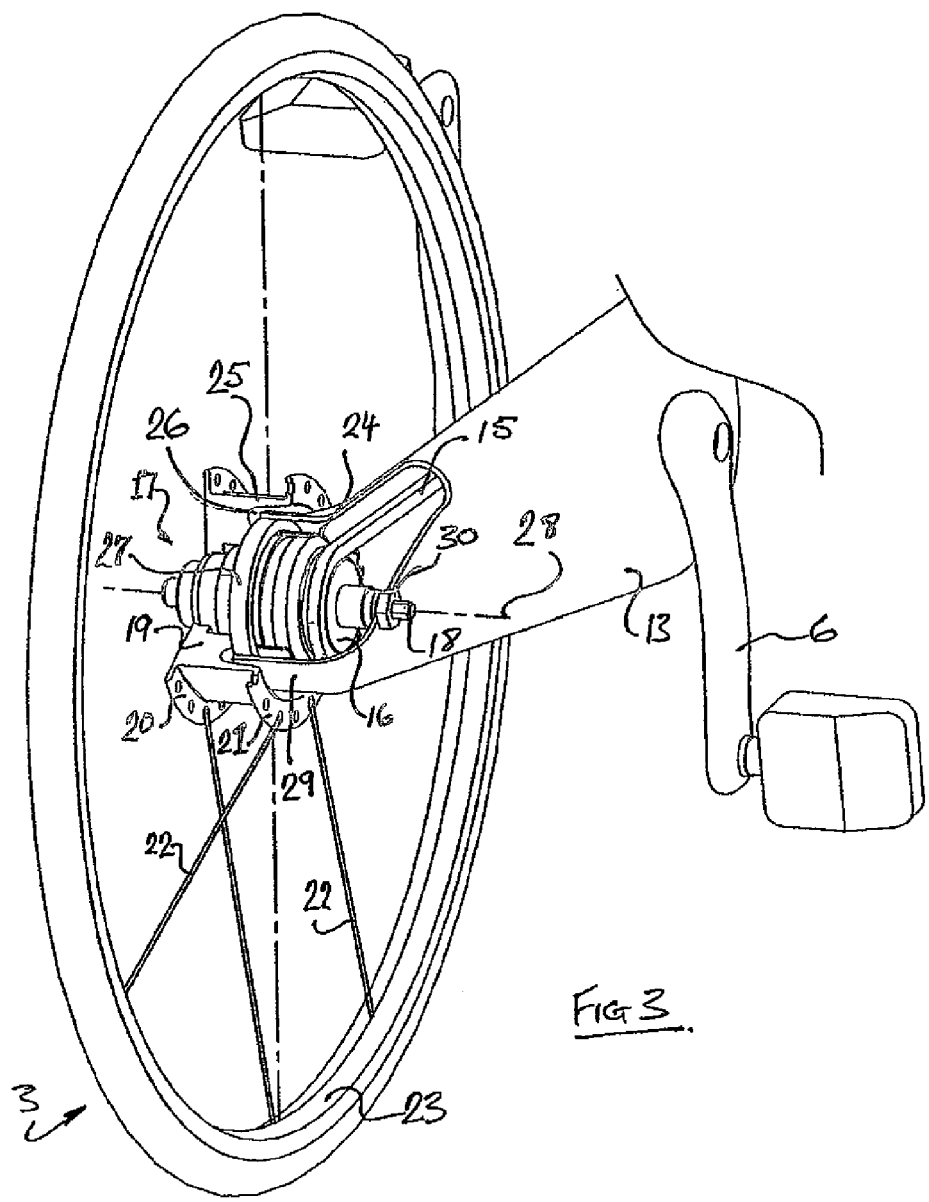
FIG. 3 is a cutaway perspective view of the rear arm and hub gear.

The rear wheel 3 is mounted to the rear arm 13 in a similar manner in both of the arrangements shown in FIGS. 1 and 2. FIG. 3 is a cut-away perspective view of the rear arm 13 and rear wheel 3, to show the hub-mounted gearbox arrangement.

Referring now to FIG. 3, the rear arm 13 is tubular in form, and the pedals 6 are mounted to a pedal spindle supported in bearings in the rear arm 13. A driving sprocket is mounted to the pedal spindle to rotate with the pedals, and a chain 15 passes round this driving sprocket and round a driven sprocket 16 associated with a hub-mounted gearbox 17.

As can be seen in FIG. 3, the rear arm 13 is tubular in form and has an internal cavity. The chain 15 is enclosed within the cavity and is thus protected from dirt and moisture. Likewise, the rider is kept out of contact with chain lubricants. The tubular rear arm 13 may be rigidly attached to the bicycle frame, as seen in FIG. 1, or may be pivotally attached as seen in FIG. 2 to provide suspension for the rear wheel. In the latter case, the pivot axis between the rear arm 13 and the bicycle frame 5 may coincide with the axis of rotation of the pedals 6, or may be offset therefrom. In the latter case, the pedals 6 may be mounted to the rear arm 13 or to the frame 5 if sufficient clearance is provided within the cavity to accommodate relative movement of the driving sprocket and the rear arm.

As stated above, the inner workings of the hub-mounted gearbox are not relevant to the present invention, in that the number of speed ratios provided by the gearbox and the means in which gear selection is effected may be entirely conventional. The hub gearbox 17 includes a central spindle 18 and an outer casing 19. In this example, the outer casing 19 has a pair of spaced external flanges 20 and 21 to receive spokes 22 connecting the hub to the rim 23 of the rear wheel 3. The outer casing 19 comprises an inner cylindrical shell 24 which surrounds the transmission components of the gearbox, and an outer shell 25 to which the flanges 20 and 21 are mounted. An annular space 26 between the inner and outer shells 24 and 25 accommodates a bearing 27, preferably arranged to be positioned centrally between the flanges 20 and 21 in the direction of the wheel axis 28.

The rear arm 13 has a lateral tubular extension 29, open at its end to closely receive the bearing 27. The rear wheel 3 is thus mounted to the arm 13 by means of the bearing 27, which supports the outer casing 19 of the hub gearbox 17. The arm 13 is provided with a bore through which the central spindle 18 of the hub gearbox 17 can extend, the central spindle 18 being secured to the rear arm 13 by a clamping nut 30. The clamping nut 30 may serve to immobilise the central spindle 18 relative to the rear arm 13, or alternatively the central spindle 18 may have a non-circular cross-section which is received in a complementary opening in the rear arm 13 to prevent relative rotation of the spindle 18 and the rear arm 13 about the rear wheel axis 28.

Figure 4:
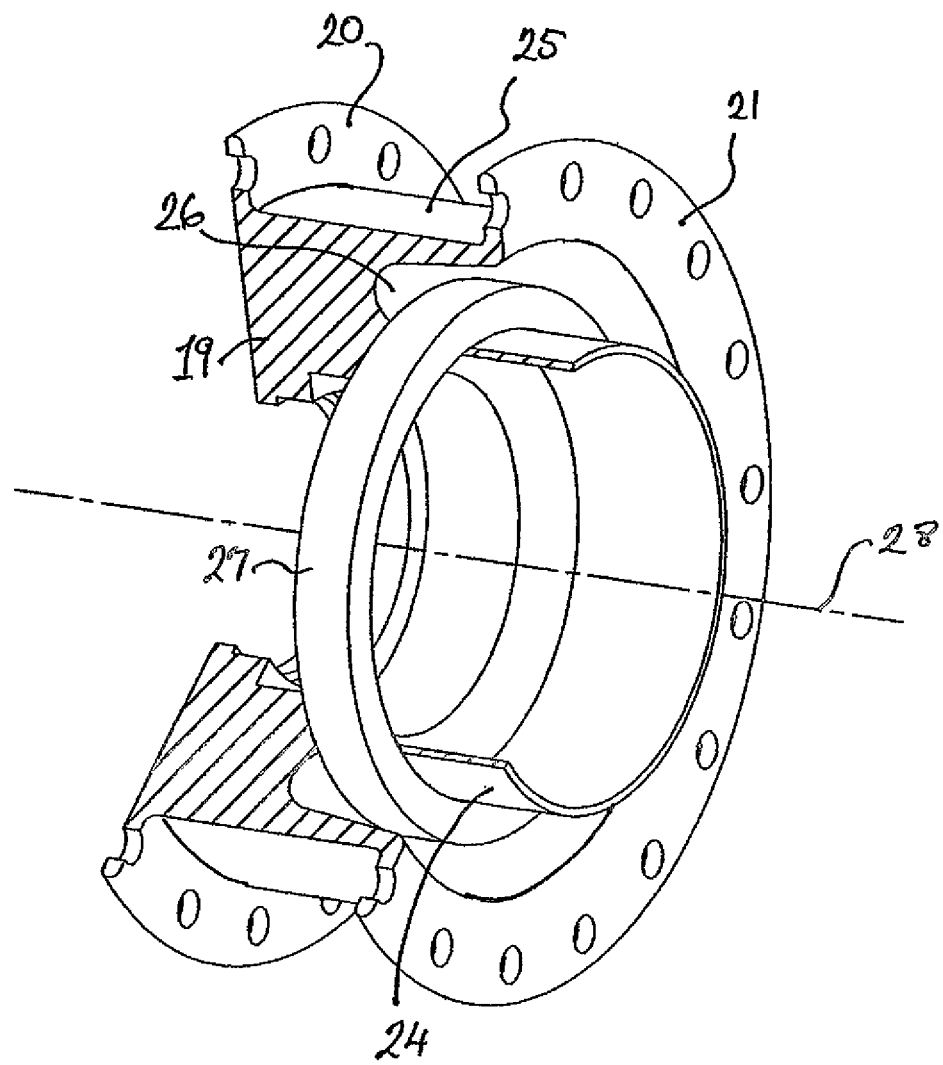
FIG. 4 is a perspective view of the hub gear housing and supporting bearing of FIG. 3.
Figure 5:
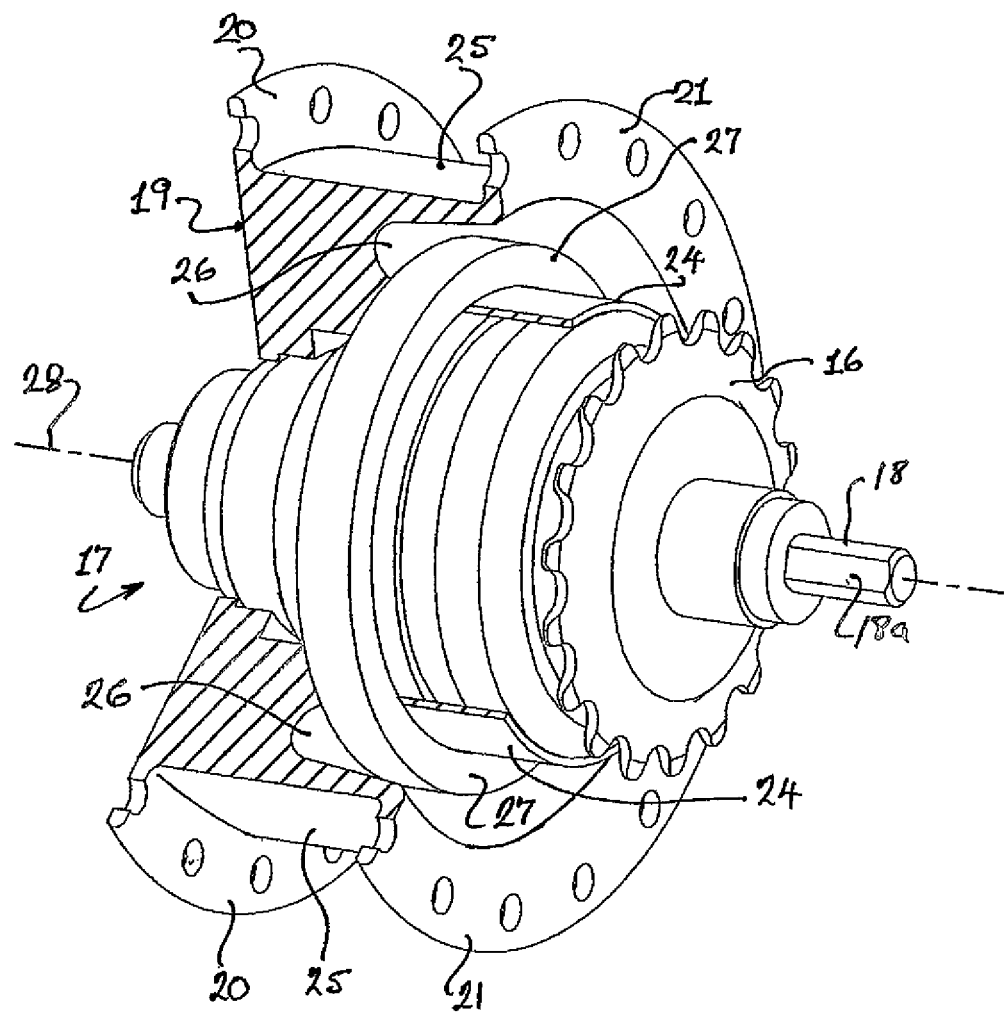
FIG. 5 is a perspective view of the hub gearbox, supporting bearing, drive sprocket and housing.

FIG. 4 shows, to an enlarged scale, the outer casing 19 and the bearing 27 of the assembly shown in FIG. 3. The transmission components of the hub gearbox and the rear arm 13, are omitted for clarity. FIG. 5 is a view similar to FIG. 4, showing the transmission components of the hub gearbox 17 in schematic form, the driven sprocket 16 and the central spindle 18. The bearing 27 is shown in position on the inner shell 24 of the outer casing 19 of the hub gearbox 17. As can be clearly seen in FIG. 5, the central spindle 18 is formed with a flat 18a to give the central spindle a non-circular cross-section. The central spindle 18 in this embodiment will be received in a "D" shaped opening in the rear arm 13, in order to prevent any rotation of the central spindle 18 about the rear wheel axis 28 relative to the rear arm 13.

This ensures that the sun gear of the planetary hub gear box remains fixed, and torque can be transmitted through the gearbox from the drive sprocket 16 to the outer casing 19. Two or more flats 18a may be formed on the spindle 18, or the spindle may have a polygonal cross-section. The opening in the rear arm 13 will be shaped to receive the spindle 18 but to prevent rotation of the spindle in the opening.

The preferred location of bearing 27 is such that rotatable bearing 27 lies in the central plane of rear wheel 3. With this preferred location, forces acting substantially perpendicular to the axis of rotation 28 of rear wheel 3 will be transferred to the rear arm 13 of bicycle frame 4 through outer hub casing 19 and rotatable bearing 27 thus substantially reducing or eliminating bending moment forces acting on central spindle 18.

It is however foreseen that the bearing 27 may be fitted externally to the lateral extension 29 of the rear arm 13, with the bearing supporting the outer shell 25 of the hub casing 19 directly by abutting the radially outer wall of the annular space 26. Furthermore, two or more bearings 27 may be mounted either internally in the extension 29 to engage the outer surface of the inner shell 24, or may be mounted externally of the extension 29 to engage the inner face of the outer shell 25.

In the previously-described example, the flanges 20 and 21 and the outer shell 25 are integrally formed as part of the outer casing 19 of the hub gearbox 17. While the tyre may be removed from the wheel 3 without the need to dismount the wheel 3 from the rear arm 13, removal of the wheel from the rear arm 13 requires removal of the gearbox 17 and disconnection of the chain 15 from the driven sprocket 16. There will now be described embodiments of the invention, which provide for simple removal of the rear wheel 3 from the bicycle frame, without disturbing the hub gearbox 17 or its connection to the chain 15.

FIGS. 6 to 10 illustrate embodiments of the invention wherein the outer casing 19 of the hub gearbox 17 is provided with a mounting arrangement to which the wheel is removably attachable.

Figure 6:
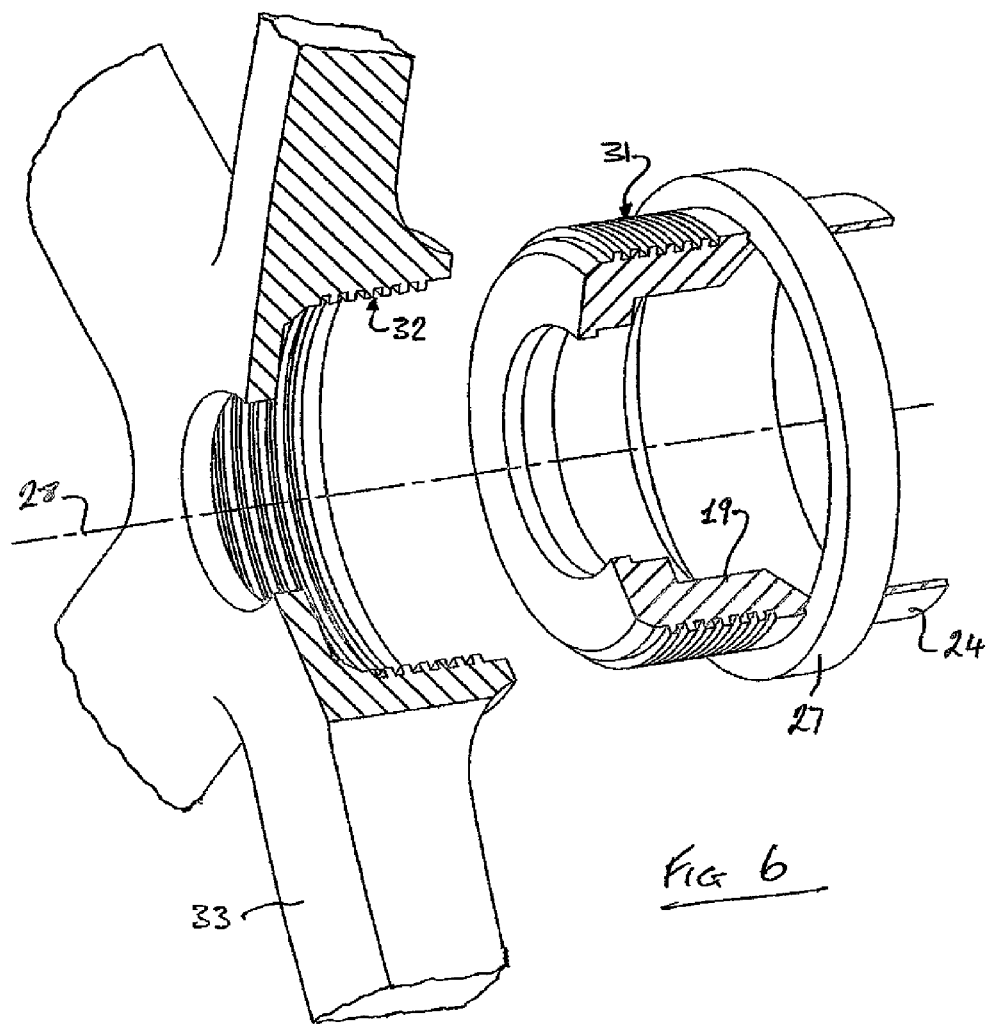
FIG. 6 is a perspective view of the hub gearbox housing, showing an alternative arrangement for attaching a bicycle wheel.

FIG. 6 shows a first alternative arrangement for attaching a bicycle wheel to the hub gearbox. Outer hub casing 19 with rotatable bearing 27 has a threaded section 31 at its free end. Threaded section 31 cooperable with a mating threaded bore 32 in a bicycle wheel 33. This alternative means for attaching a bicycle wheel allows removal of the bicycle wheel by unscrewing mating threaded bicycle wheel 33 from outer hub casing 19. A locking arrangement such as a locknut (not shown) or an axially-extending locking pin such as that shown in FIG. 8 may be provided on the threaded section 31 to secure the wheel against inadvertent loosening.

Figure 7:
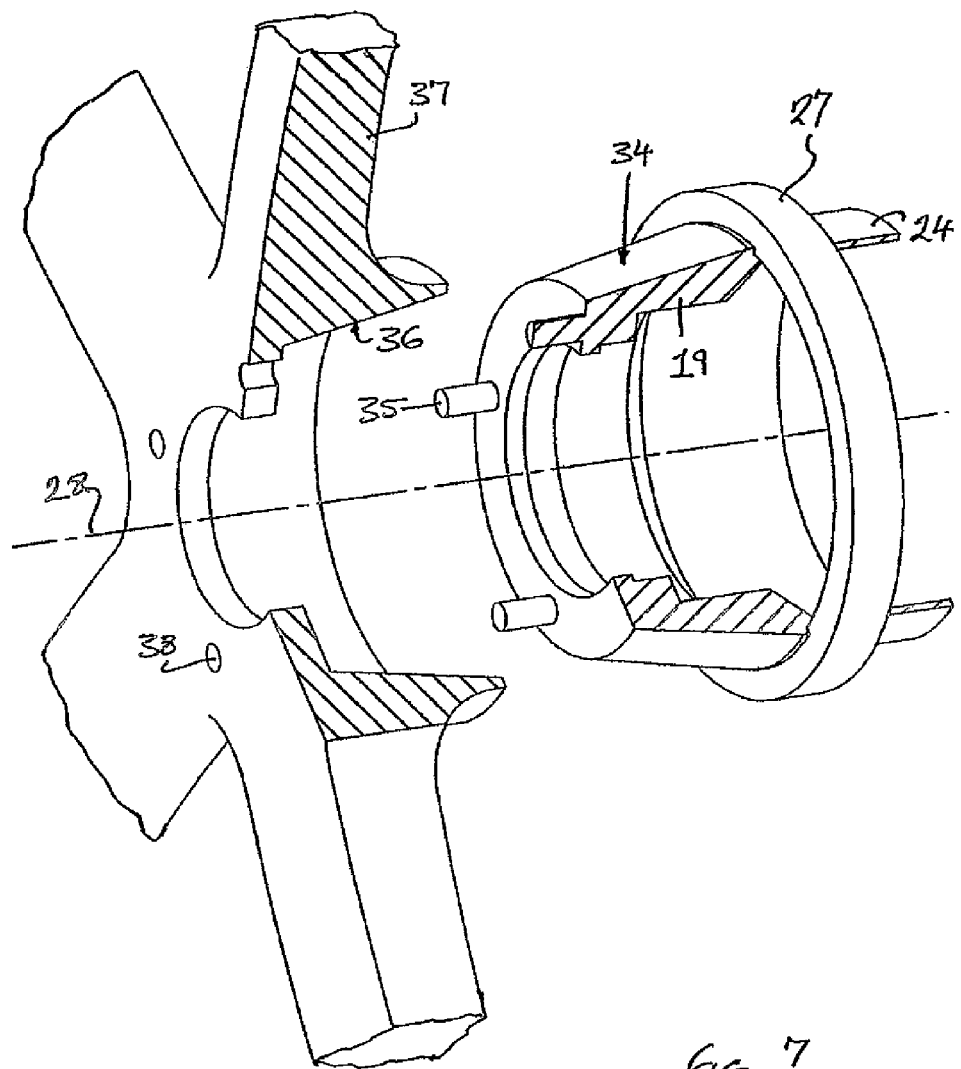
FIG. 7 is a view similar to FIG. 6, illustrating a second alternative attachment arrangement.

FIG. 7 shows a second alternative arrangement for attaching the bicycle wheel to the hub gearbox. Outer hub casing 19 with rotatable bearing 27 has a tapered section 34 at its free end and drive pins 35 extending axially from the end of tapered section 34. Tapered section 34 cooperates with a mating tapered bore 36 in a bicycle wheel 37. Drive pin holes 38 are provided in the bicycle wheel 37 to accept the drive pins 35 as the tapered bore 36 is placed over the tapered section 34 of the outer casing 19 of the hub gearbox 17. Drive pins 35 prevent bicycle wheel 37 from rotating independently of outer hub casing 19. A retaining means such as an axially extending locking pin such as that shown in FIG. 8 may be provided to retain the wheel on the tapered section 34. Alternatively, pins 35 may be threaded to receive threaded nuts to retain the wheel.

Figure 8:
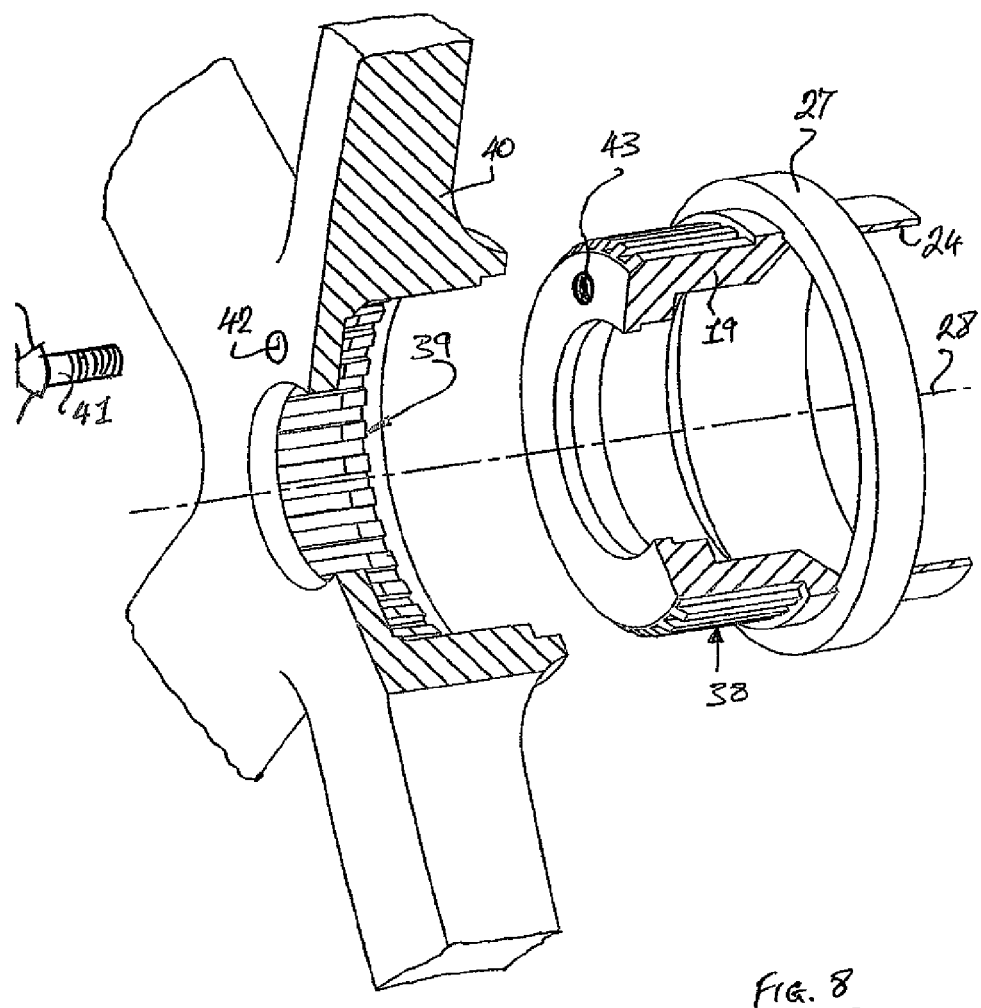
FIG. 8 is a view similar to FIGS. 6 and 7, illustrating a third attachment arrangement.

FIG. 8 shows a third alternative arrangement, in which outer hub casing 19 with rotatable bearing 27 has a splined section 38 at its free end. Splined section 38 is cooperable with a mating splined bore 39 in bicycle wheel 40. Splined section 38 cooperates with splined bore 39 to prevent bicycle wheel 40 from rotating independently of outer hub casing 19. Locking means, such as an axially extending threaded fastener 41 extending through a clearance hole 42 in the wheel 40 to engage a threaded bore 43 in the hub casing 19, may be provided to retain the wheel on the hub casing. The threaded fastener 41 may have a hand operable "butterfly" head 44, or may be a tool-operated fastener such as a hexagon head, slotted head, or socket screw.

Figure 9:
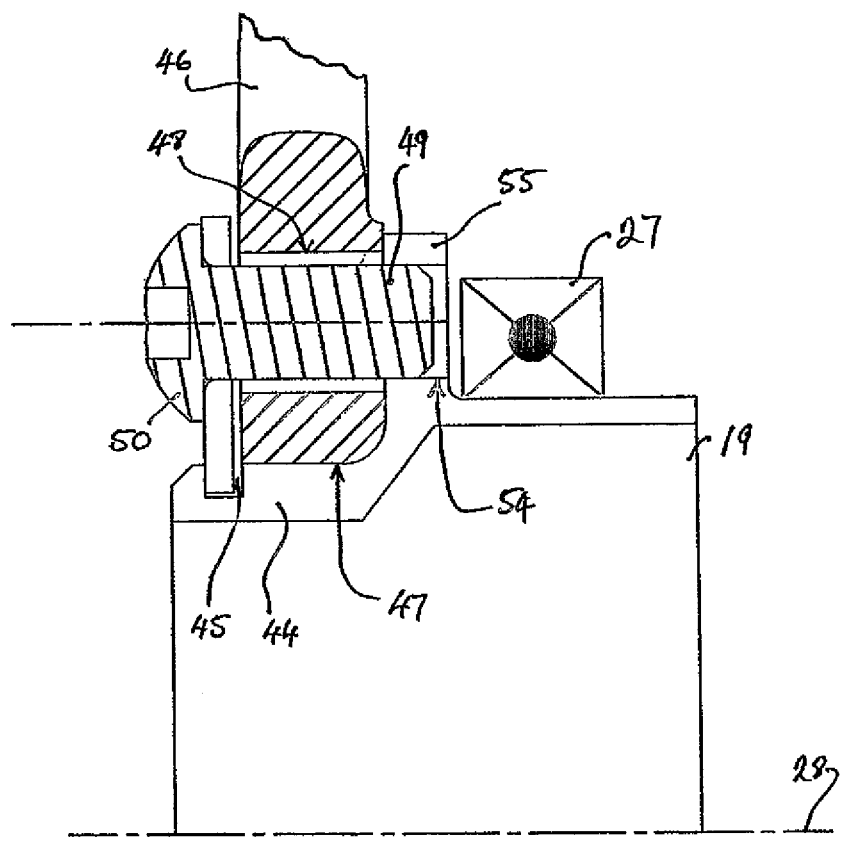
FIGS. 9 and 10 are sectional and perspective views, respectively, showing a fourth wheel attachment arrangement.
Figure 10:
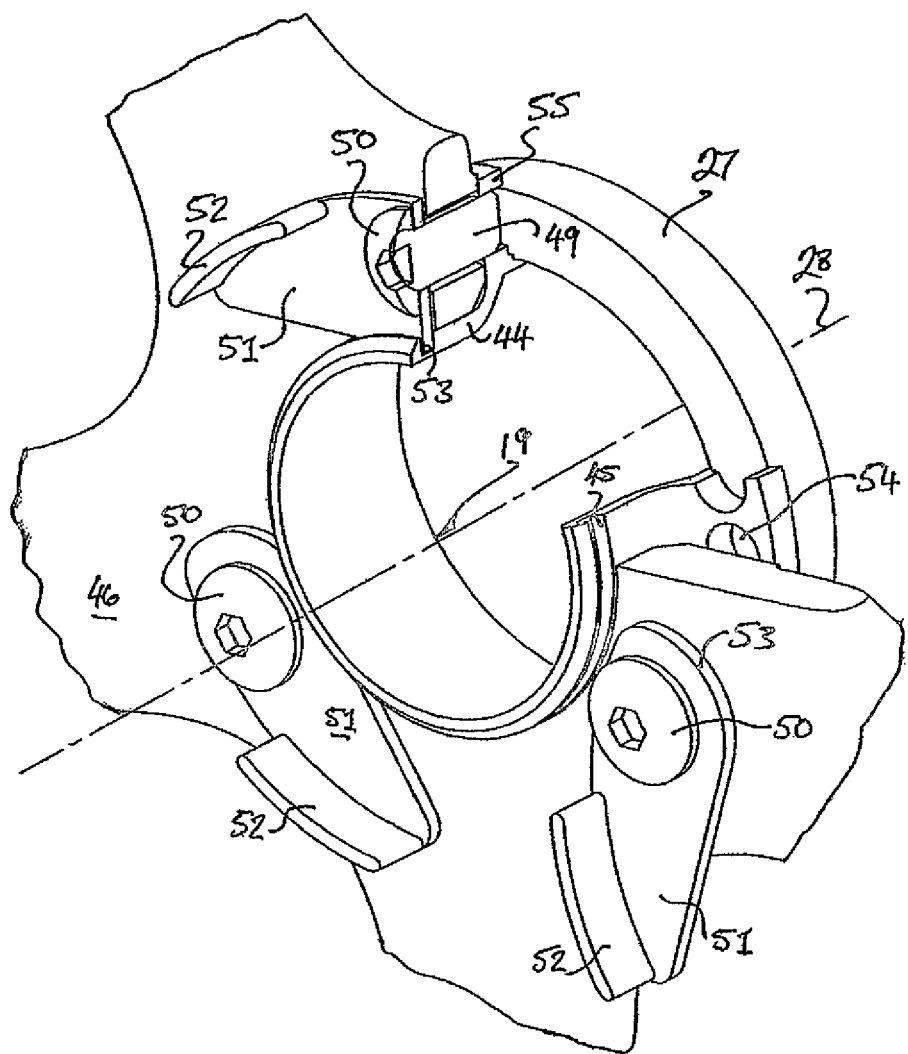

FIGS. 9 and 10 are sectional and perspective views, respectively, of a fourth alternative arrangement for mounting a bicycle wheel to the hub gearbox. In the arrangement shown, the outer casing 19 of the hub gearbox 17 is formed at its free end with a protruding cylindrical section 44 having a circumferential external groove 45. The bicycle wheel 46 is formed with a central bore 47 which closely engages the outer surface of the cylindrical section 44 of the hub. Adjacent the bore 47, the wheel 46 is provided with three threaded holes 48, through which threaded fasteners 49 extend. The threaded fasteners 49 have an enlarged head 50 at one end, to which an operating lever 51 is attached. The end of the fastener 49 remote from the head 50 protrudes beyond the threaded bore 48.

The operating levers 51 have a grip portion 52 at one end, and an engaging lobe 53 adjacent the head 50 of the fastener 49.

To mount the wheel to the hub gearbox, the wheel is offered up so that the protruding cylindrical section 44 enters the bore 47 of the wheel 46. The wheel is then aligned with the outer casing 19, so that the protruding ends of the fasteners 49 enter clearance openings 54 in a flange 55 surrounding the base of the cylindrical protruding section 44 of the outer casing 19 of the gearbox. The operating levers 51 are then rotated by means of the gripping portions 52, so that the engagement lobes 53 of the levers 51 engage the circumferential groove 45. As the levers 51 are rotated with the engaging lobes 53 in the groove 45, the threaded engagement between the fasteners and the threaded bores 48 causes the wheel 46 to be clamped securely onto the flange 55, as the fasteners 49 are withdrawn from the threaded bores 48 with the engagement lobes 53 in contact with the wall of the groove 45.

In addition to the mounting arrangements described in the Figures, other arrangements for releasably mounting a wheel to the end of the outer casing 19 of the hub gearbox remote from the rear arm 13 are possible and are to be considered as included in the scope of the present application.

Figure 11:
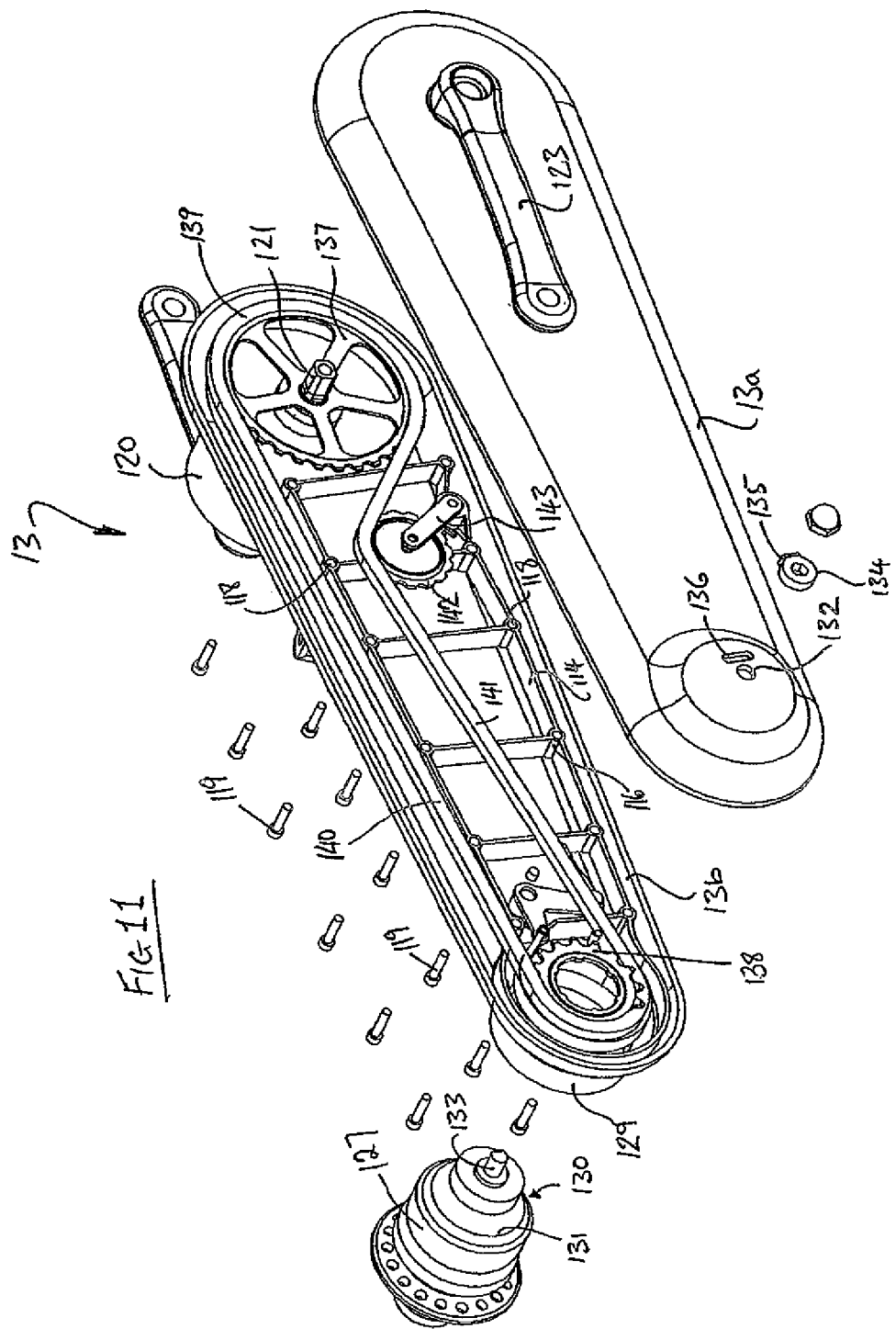
FIG. 11 is an exploded perspective view from the off side of a rear arm for a bicycle, in accordance with a preferred embodiment of the invention.

A preferred embodiment of the rear arm structure is shown in FIGS. 11 to 13. Referring to these Figures, the rear arm 13 is formed from a pair of concave half-shells 13a and 13b. The half-shells 13a and 13b have internal ribs 113, 114 extending between studs 115, 116 integrally formed with the ribs 113, 114 and the half-shells 13a, 13b respectively. The studs 115 of half-shell 13b are formed with blind threaded holes 117, while the studs 116 of half-shell 13a are formed with through holes 118. Threaded fasteners 119 are passed through the holes 118 to engage with the threaded holes 117, and tightened to secure the half-shells 13a, 13b together. The ribs 113 of half-shell 13a are cutaway, as at 113a, to provide clearance for the internal components to be received within the rear arm.

Half-shell 13b is formed at its front end with a cylindrical projection 120, which encloses a bearing to mount a pedal axle 121 to the half-shell 13b. Half-shell 13a has an opening 122 at its forward end, to allow pedal axle 120 to pass through and offside crank 123 to engage the exposed end of axle 121. A nearside crank 124 is mounted to the protruding end of the axle 121, at the free end of the projection 120. The rear arm shown in FIGS. 11 and 12 is intended for a bicycle with rear suspension, the rear arm being mounted to the bicycle frame in bearings (not shown) surrounding the projection 120 and coaxial with the pedal axle 121.

Positioned intermediate the length of the half-shell 13b is a suspension mounting lug 13d, to which one end of a spring/damper assembly 14 may be attached. The other end of the spring/damper assembly 14 is attached to the frame of the bicycle, as is seen in FIG. 2.

At the rear end of half-shell 13b, a second tubular projection 129 extends parallel to the projection 120. The projection 129 corresponds in function to the lateral tubular extension 29 shown in FIG. 3, and is open at its free end to closely receive a bearing 127 mounted on the casing of a hub gearbox 130. The rear wheel 3 is mounted to the rear arm 13 by means of the bearing 130, which supports the outer casing 131 of the hub gearbox 130. The half-shell 13a is provided with a bore 132 through which a central spindle 133 of the hub gearbox 130 can extend, the central spindle 133 being secured to the half-shell 13a by a sleeve 134 which engages a "D" section end of the spindle 133 and secures the spindle against rotation relative to the rear arm by means of a lug 135 on the sleeve 134 engaging in a slot 136 in the half-shell 13b. Alternatively the spindle 133 may have a non-circular cross-section which is received in a complementary opening 132 in the half-shell 13a to prevent relative rotation of the spindle 133 and the rear arm 13.

When fixed together with fasteners 119, the half-shells 13a, 13b define a substantially closed cavity to contain a driving sprocket 137 mounted on the pedal axle 121, a driven sprocket 138 coaxial with the spindle 133, and a chain loop 139 for transmitting drive from sprocket 137 to sprocket 138. The chain loop comprises an upper chain run 140 and a lower chain run 141, the lower chain run 141 being engaged by a jockey 142 mounted to a swing arm 143 biased to urge the jockey toward the upper chain run 140. The swing arm biasing is arranged to ensure the correct tension in the chain 139, and to compensate for chain length variations, since the distance between centres of the pedal axle 121 and spindle 133 is fixed. Other chain tensioning arrangements may be used, such as a pair of jockeys engaging opposite sides of the lower chain run 141 and urged in opposite directions.

To provide the smallest possible overall size to the rear arm 13, the ribs 113, 114 and the studs 115, 116 are positioned such that the region of the rear arm 13 above the upper chain run 140 is free of studs 115, 116. Most preferably, a region bounded by vertical planes AA and SS, containing the axes of the pedal axle 121 and the spindle 133 respectively, and above the common tangent TT to the sprockets 138 and 139, is free of ribs 113, 114 and studs 115, 116. The structure of the assembled rear arm is such that the loads imposed by the wheel, suspension, and pedals are transmitted predominantly by the ribs 113 114 forming a box-like structure within the cavity in the rear arm. The outline of the rear arm is smooth, without irregular excrescences for positioning fixing screws to hold the half-shells together. If all the ribs and studs are positioned within a region bounded by the two common tangents to the sprockets 138 and 139, a rear arm of reduced outline can be effectively achieved. Due to the re-entrant shape of the chain loop caused by the tensioning jockey 142, the studs 115, 116 may not all be within the chain loop in such an embodiment As an alternative to the projection 120 and suspension lug 13d, the front end of the half-shell 13b may include alternative formations for fixed mounting of the rear arm 13 to a bicycle frame, as seen in FIG. 1.

The half-shells are preferably formed from metal or metal alloy, and most preferably by moulding methods such as casting or die-casting. The half-shells may alternatively be formed by fabrication from metals and/or from plastics or composite materials.

What is claimed is:

1. A bicycle wheel and hub gearbox assembly, comprising:
a planetary hub gearbox having a generally cylindrical casing, the casing being adapted to be mounted to a bicycle frame by means of a bearing positioned intermediate an axial extent of the casing, with one axial end of the planetary hub gearbox being unobstructed by the bicycle frame; and
the assembly further comprising a bicycle wheel having releasable mounting elements cooperable with mounting formations formed on the one axial end of the planetary hub gearbox for releasably mounting the wheel to the casing,
wherein when the wheel is mounted to the planetary hub gearbox casing, the bearing is positioned substantially central, in the axial direction, relative to the wheel.

2. A bicycle wheel and hub gearbox assembly according to claim 1, wherein the casing comprises coaxial outer and inner shells separated by an annular recess open towards the axial end of said hub remote from said one axial end, and wherein the bearing surface is a radially-facing surface within the annular recess.

3. A bicycle wheel and hub gearbox assembly according to claim 2, wherein the bearing surface is provided on a radially-outwardly facing surface of the recess.

4. A bicycle wheel and hub gearbox assembly according to claim 2, wherein the bearing surface is provided on a radially-inwardly facing surface of the recess.

5. A bicycle wheel and hub gearbox assembly according to claim 1, wherein the mounting formation comprises a splined shaft coaxial with the hub gearbox casing.

6. A bicycle wheel and hub gearbox assembly according to claim 1, wherein the mounting formation comprises a tapering conical projection coaxial with the hub gearbox casing.

7. A bicycle wheel and hub gearbox assembly according to claim 1, further including retaining means operable to retain the bicycle wheel mounted to the hub against movement in the axial direction away from the hub gearbox casing.

* * * * *